June 12, 1934.    B. M. LEECE    1,962,993
SPRING DRIVE
Filed Oct. 16, 1930

Inventor
Bennett M. Leece
Knox Hudson & Kent
attys.

Patented June 12, 1934

1,962,993

UNITED STATES PATENT OFFICE 1,962,993

SPRING DRIVE

Bennett M. Leece, Cleveland, Ohio, assignor to
The Leece-Neville Company, Cleveland, Ohio,
a corporation of Ohio Application October 16, 1930, Serial No. 489,056

3 Claims. (Cl. 64—96)

This invention relates to improvements in spring drives, that is, drives embodying springs for yieldably connecting two aligned shafts so that variations in speed occurring suddenly in one shaft may be transmitted gradually to the other shaft. The drive herein disclosed is intended primarily as an operative connection between an electric generator and an aircraft engine, where changes in engine speed may be rapid, not only in starting but during operation, as when the plane dives or encounters air pockets. However, the device has utility in various other mechanisms where a resilient power application is desirable.

One of the objects of the invention is the provision of a drive of this character wherein the leaves of each spring are set into the device without fastenings of any kind and permitted to have freedom of motion lengthwise one upon another when the spring is flexed, thereby cutting down fatigue of the metal and greatly increasing the life of the spring.

A further object is to distribute the spring loading over a considerable area.

Another object is the provision of a drive of this kind in which there is possible a comparatively large amount of relative rotation between the driving and driven elements for the purpose of providing thereby a more gradual cushioning effect than has been feasible heretofore.

Other objects and features of novelty will appear as I proceed with the description of those embodiments of the invention which, for the purposes of the present application, I have illustrated in the accompanying drawing, in which.

Figure 1:
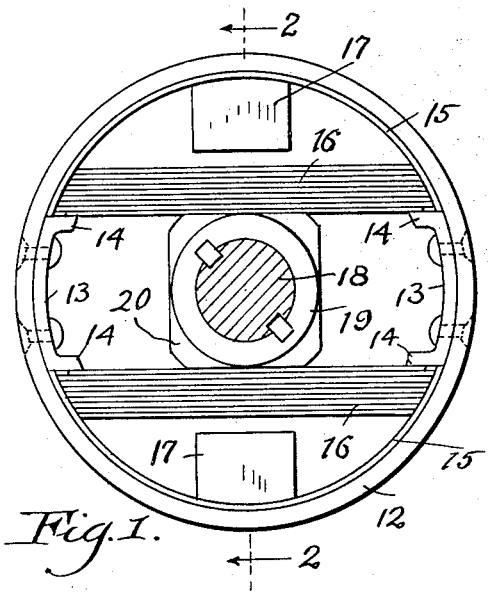
Fig. 1 is an end elevation of a flexible drive connection embodying the invention, the cover plate of the outer element being removed to more clearly illustrate the construction.
Figure 2:
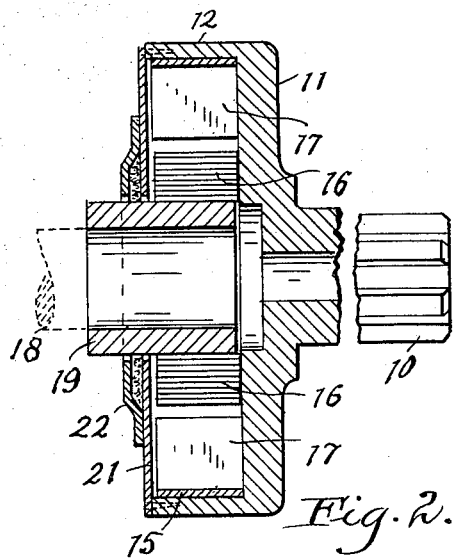
Fig. 2 is a vertical transverse sectional view of the same taken substantially on the line 2—2 of Fig. 1.

Referring first to that form of the invention that is illustarted in Figs. 1 and 2, 10 indicates a splined shaft which is adapted to be set into a suitable rotating receptacle in an internal combustion engine, the receptacle being suitably geared to the crankshaft of the engine. Integral with the shaft 10 is a forged cup 11, the side wall of which is hereinafter referred to as a ring 12 which constitutes, in effect, the driving element of the connection. To the inner wall of this ring at points diametrically opposite each other are riveted or otherwise secured arc-shaped shoes 13 flanged inwardly at their ends to constitute abutments 14. Against the wall of the ring 12 on either side of the opposed shoes 14, I position a hardened steel liner 15. A multiple leaf spring 16 is inserted into the cup beyond each pair of shoes 13, the inner leaf bearing at its ends against the abutments 14 and the other leaves being graduated as to length so as to fit within the liner 15.

Stop blocks 17 are fixed within the cup 11 opposite the central points of the spring 16 and spaced a short distance therefrom in the normal position of the springs. These blocks may be mounted in any convenient manner, as by welding to the back of the cup 11 or to the liner 15, or by the use of suitable fasteners. These blocks are selected as to size or adjusted as to position so as to stop the flexure of the springs 16 at the desired point, as will be explained hereinafter.

18 is a driven shaft, as for instance the shaft of an electric generator. To it there is keyed the driven element of the connection, which is a sleeve 19 having thereon an integral cam 20. In this instance the cam takes the form of a square with rounded corners. The sides of the square constitute low spots and the corners are the high spots. Two of the low spots normally engage the inner leaves of the springs 16.

To the rim of the cup 11 I attach by screws or the like a cover plate 21 having a central aperture to receive the sleeve 19, and to this plate I may weld a dished plate 22 also having a central aperture, the space between these two plates constituting a chamber for packing which acts to retain the grease with which the interior of the cup 11 is preferably filled.

In the normal operation of the device, the flat sides of the springs 16, which are in engagement with low spots of the cam 20, form a driving connection that is more or less positive for constant speed. In the event that there is a sudden acceleration of the engine, however, the driving ring 12 tends to run ahead of the driven sleeve 19. This causes the springs 16 to move over the surfaces of the cam toward the high spots thereon. This of course causes the springs 16 to flex. The extent of the relative angular movement between the driving and driven elements in the case of the construction of Figs. 1 and 2 may be approximately 45°, or until there is relative movement between two of the high spots of the cam from the position shown to positions almost opposite the center points of the springs. The high spots of the cam must not travel across or beyond the center points of the springs, and the means which I provide for preventing such action are the stops 17 which engage the springs when the deflection of the latter reaches a safe limit for preventing the cam high spots from running over center. When the springs are flexed, each of their leaves is individually free to move lengthwise upon the leaves adjacent thereto. Furthermore, the flexing of the springs shortens the distance between their ends, and one or both ends of each spring move away from the abutments 14 along the hardened liner 15, which saves wear upon the ring 12.

When the relative motion takes place in an opposite direction, as when the engine speed suddenly decreases, the shaft 18 tends to run ahead of the shaft 10 and the travel of the spring over the cam is in a different direction toward a different high spot. Hence the wear upon the inner spring leaf occurs in two different places. To further combat wear, this leaf of the spring may be made shorter than the next leaf in order that it may work back and forth to distribute the wear over a considerable surface, and, if desired, the inner leaf may be made harder than the other leaves so that the wear upon it will be less rapid.

Figure 3:
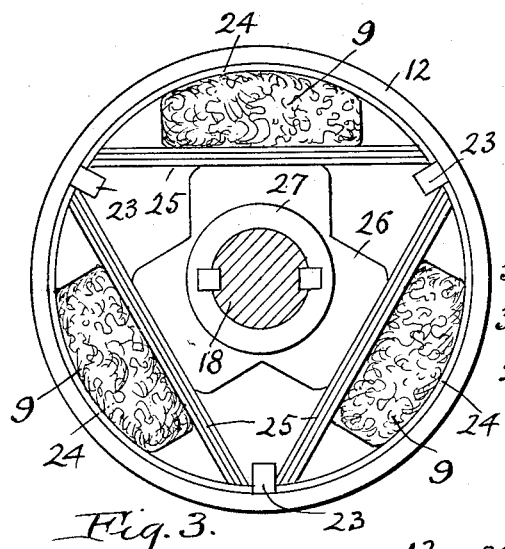
Fig. 3 is a view similar to Fig. 1 illustrating a modified form of the invention in which three springs are employed.

In the modification illustrated in Fig. 3, the ring 12 has welded or otherwise secured thereto three abutments 23 spaced equidistantly. Liners 24 are mounted in the ring between successive abutments. Three multiple leaf springs 25 are mounted between the liners 24 and the corresponding pairs of abutments 23. Each of these springs is normally engaged by a flat or low spot on a cam 26 made as an integral part of a sleeve 27 corresponding with the sleeve 19 of the first described form of the invention. The operations and functions of the various parts correspond closely with those of the corresponding parts of Figs. 1 and 2 as will be readily understood. In this figure, however, instead of rigid stops for the springs, I show felt pads 9 which are compressed when the springs flex and therefore tend to limit the flexure. In other words, they constitute cushioned stops rather than rigid stops. They also serve to dampen any vibratory action of the springs. Where such pads are used the drive casing may be filled with oil which is absorbed by the felt in its normal condition and is squirted out when the pads are compressed, thus facilitating lubrication. Although it is not essential, these pads may be fastened in place by suitable means, if desired.

Figure 4:
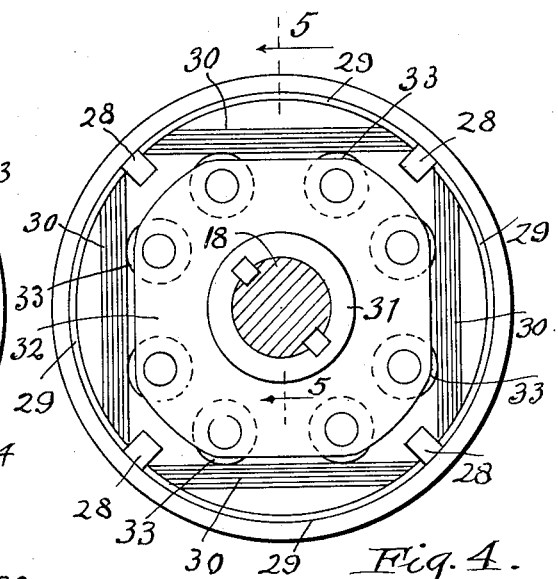
Fig. 4 is a corresponding view of a further modification utilizing four springs.
Figure 5:
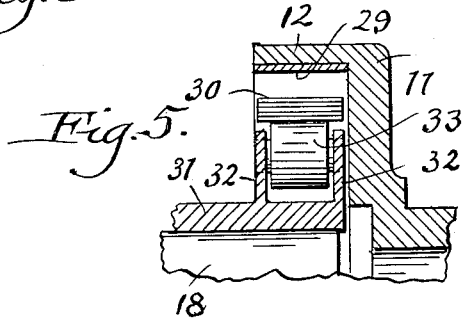
Fig. 5 is a fragmental transverse sectional view taken substantially on the line 5—5 of Fig. 4.

In Figs. 4 and 5 I have shown still another modification, wherein there are four evenly spaced abutments 28, four liners 29 and four multiple leaf springs 30. In this case, the driven sleeve 31 carries a pair of plates 32 in which are mounted at suitable intervals antifriction rollers 33 which project outwardly a slight distance beyond the perimeters of the plates 32. These rollers are so positioned that two of them normally engage each of the springs 30. When there is relative motion between the driving and driven elements, one of the rollers 33 runs along the adjacent spring 30 and flexes the same. These rollers together, therefore, take the place of the cam in the other forms of the invention. Obviously, a plain cam could be employed in a four spring unit such as is illustrated in Fig. 4, and quite as obviously the rollers could be utilized in three and two spring units if desired. Their use eliminates most of the friction between the springs and cams and of course reduces greatly the wear upon the inner spring plates. The reduction of friction may not be desirable in all cases however.

In Figs. 4 and 5 I have shown no stops to correspond with the stops 17 and 9 of the previously described forms. In this case, the spring tension is so adjusted as to limit its own deflection and the corresponding throw of the cam. This, of course, is quite possible also where a smaller number of springs is employed.

In any or all of the forms illustrated the springs may or may not be subjected to an initial tension.

In the foregoing description I have necessarily gone somewhat into detail in order to explain fully the particular embodiments of the invention herein illustrated, but I desire it to be understood that such detail disclosures are not to be construed as amounting to limitations except as they may be included in the appended claims.

Having thus described my invention, I claim:

1. A flexible shaft coupling comprising a casing having an arcuate inner surface, a cam in said casing, a leaf spring in said casing for limiting relative rotary movement between the cam and casing, means for positioning the spring in the casing with the spring ends engaging said arcuate surface and with an intermediate portion of the spring engaged by said cam, said positioning means being on the same side of the spring as said cam and the leaves of said spring being cut to successively shorter lengths corresponding to successive chords of said arcuate inner surface the latter surface being unobstructed for a distance behind the ends of the spring whereby upon deflection of the spring by said cam said intermediate portion of the spring is bowed toward the arcuate inner surface and the ends of said leaves move away from said positioning means and slide upon said arcuate inner surface.

2. A flexible shaft coupling comprising a casing, a cam in said casing, a leaf spring in said casing for limiting relative rotary movement between the cam and casing, spaced abutment means carried by the casing and engaging the spring adjacent the ends thereof for positioning the spring in the casing with an intermediate portion of the spring engaged by said cam whereby upon relative movement between the casing and cam said intermediate portion of the spring is bowed toward a portion of the casing intermediate said spaced abutments, and a resilient pad interposed between said intermediate portion of the spring and said intermediate portion of the casing for limiting the deflection of the spring by said cam, 3. A flexible shaft coupling comprising a casing, a cam in said casing, a leaf spring in said casing for limiting relative rotary movement between the cam and casing, spaced abutment means carried by the casing and engaging the spring adjacent the ends thereof for positioning the spring in the casing with an intermediate portion of the spring engaged by said cam whereby upon relative movement between the casing and cam said intermediate portion of the spring is bowed toward a portion of the casing intermediate said spaced abutments, a resilient absorbent pad interposed between said intermediate portion of the spring and said intermediate portion of the casing and adapted to be compressed upon deflection of the spring by said cam, and lubricant in said pad adapted to be squeezed therefrom when the pad is compressed.

BENNETT M. LEECE.